Dec. 28, 1954   C. V. GAGEN   2,698,205
CONTROL VALVE
Filed Jan. 27, 1948
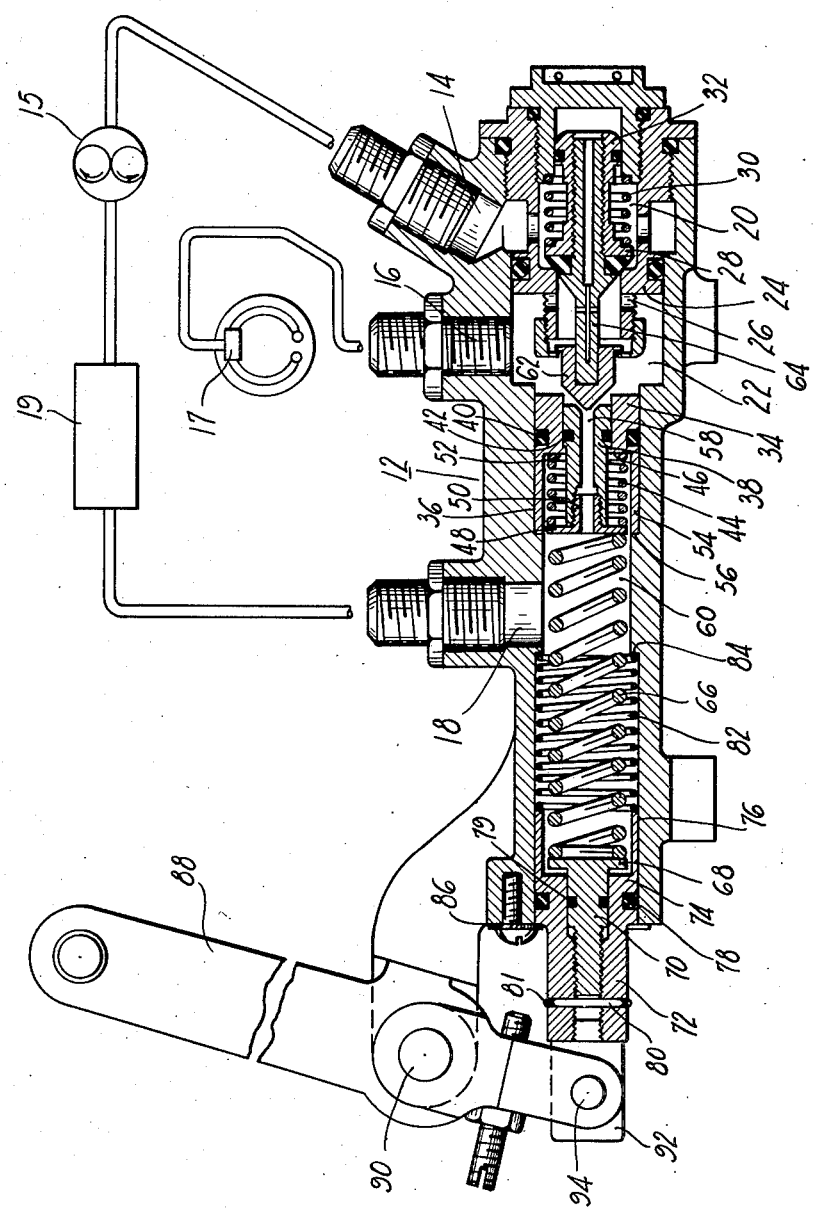
INVENTOR.
CHARLES V. GAGEN
BY
T. J. Plante
ATTORNEY

United States Patent Office 2,698,205
Patented Dec. 28, 1954

2,698,205

CONTROL VALVE

Charles V. Gagen, Lafayette, Ind., assignor to Bendix Aviation Corporation, South Bend, Ind., a corporation of Delaware Application January 27, 1948, Serial No. 4,511

6 Claims. (Cl. 303—54)

This invention relates to fluid pressure control valves, and particularly to control valves of the class referred to as reducing valves. Valves in this group are used to regulate, or control, the transfer of pressure fluid from a fluid pressure source to a fluid pressure operable motor.

In reducing valves, such as those used to control airplane brakes, it is customary to incorporate a "reaction" piston, which is acted on by a pressure having the same value per unit of area as the pressure transmitted to the controlled motor.

With this arrangement, a force having a proportional relationship to the force acting on the brakes must be resisted by the operator in order to continue or increase the power applied to the brakes. In installations where a low operating force is desired, i. e., where the force required to be exerted by the operator is minimized, it is difficult to obtain well-graduated, responsive control of the valve in the low pressure range. This is true because a certain minimum force is required to open the inlet valve, and an appreciable line pressure must be developed before said line pressure, acting against the small reaction piston, can move the reaction piston back sufficiently to permit the inlet valve to close and disconnect the controlled pressure from the fluid pressure source. Therefore, the initial opening of the inlet valve causes the brake pressure to rise, almost immediately, to a certain minimum value, below which the brake pressure is substantially uncontrollable.

It is the primary object of the present invention to provide, in a fluid pressure control valve, a reaction device which will improve the controllability of the valve in the low pressure range, without requiring an increase in the force exerted by the operator in the high pressure range. This is accomplished by using a "two-stage" reaction device, in which, in the low pressure range, the total reaction force is relatively high in proportion to the line pressure, whereas, in the high pressure range, the total reaction force is relatively low in proportion to the line pressure.

Other objects and advantages of the present invention will become apparent during the following description of an illustrative embodiment of the invention, reference being had therein to the accompanying drawing, in which the figure is a longitudinal section, showing the operating parts of a control valve which incorporates my invention.

Referring to the figure, the improved fluid pressure control valve comprises a casing 12 having an inlet port 14, an outlet port 16, and an exhaust port 18. The inlet port 14, which is intended to be connected to a fluid pressure source, such as a pump 15, or accumulator, communicates with chamber 20 inside the control valve casing. Outlet port 16, which is intended to be connected to a fluid pressure controlled motor, such as the brake cylinder 17, communicates with chamber 22 inside the control valve. Chambers 20 and 22 are separated by a sealed partition 24, through the center of which extends a passage 26. Opening and closing of passage 26 are controlled by inlet valve 28, which may be constructed, as shown, in accordance with the disclosure of Gagen appln. Ser. No. 565,068, filed November 25, 1944, now Patent No. 2,452,647. Detailed discussion of the construction of the inlet valve is not deemed necessary for the purposes of the present application, except to point out that the valve is biased to seated position by spring 30 and by the pressure of fluid in chamber 20 acting on a very small area which represents the difference between the effective area of the valve seat and the area of extension 32 of the inlet valve element.

The "two-stage" reaction device includes two reaction members. One of the reaction members is an annular piston 34, which is reciprocable in the bore 36 of casing 12. The other reaction member is a plunger 38, which is mounted in the center of the annular piston 34, and which is capable of reciprocating movement with respect to said piston. An annular sealing member 40 prevents flow of fluid along the periphery of the piston, and an annular sealing member 42 prevents flow of fluid between the outer surface of the plunger and the inner surface of the piston.

A spring 44 is compressed between a surface 46 on piston 34 and a flange 48 provided on a spring retaining member 50, which is screwed into the rear of plunger 38. Spring 44 urges the plunger toward the rear of the piston, the rearward movement of the plunger with respect to the piston being limited by means of a shoulder 52 provided on the piston. The piston has a tubular skirt 54 which engages a shoulder 56 provided in casing 12 to limit rearward movement of the piston under the influence of pressure exerted against the face of the piston.

A passage 58 extends through the center of plunger 38, normally providing communication between chamber 22 and a chamber 60, which communicates through port 18 with the reservoir 19. Therefore, in released position, the controlled motor communicates through chambers 22 and 60 with the reservoir. Closing of passage 58, when the controlled motor is to be actuated, is accomplished by outlet valve element 62, which engages the stem 64 of inlet valve element 28. The arrangement is such that movement of plunger 38 toward the right first seats outlet valve 62 and thereafter unseats inlet valve 28, to admit fluid under pressure to chamber 22 and the controlled motor.

Plunger 38 is advanced (moved toward the right) by force exerted through a spring 66. The forward end of the spring engages flange 48 of the plunger, and the rearward end of the spring engages a flange 68 provided on an adjusting screw 70, which has threaded engagement with an actuating rod 72. The forward portion 74 of actuating rod 72 is slidably mounted in bore 76 of valve casing 12, and carries an annular sealing member 78. Another annular sealing member 79 is provided between the adjusting screw 70 and actuating rod 72. A locking pin 80, held in position by snap ring 81, normally prevents rotation of adjusting screw 70 inside actuating rod 72, but, after pin 80 has been removed, a screwdriver can be inserted to turn the adjusting screw and vary the distance between flange 68 and flange 48. This adjustability is necessary in order that an initial adjustment can be made to compensate for slight variations in the length of spring 66. In its fully extended position, spring 66 must permit the proper amount of clearance between outlet valve element 62 and the front end of plunger 38.

A return spring 82, which engages a shoulder 84 provided inside the valve casing, acts against the forward portion 74 of actuating rod 72 to urge the latter to released position. Retractile movement of the actuating rod is limited by a washer 86, which is secured to the end of the valve casing. The actuating rod may be operated by means of a control lever 88, pivoted at 90, and connected to a forked end 92 of the actuating rod by means of a pin 94.

In operation, rotation of lever 88 in a counter-clockwise direction causes a force to be exerted through actuating rod 72 and flange 68 of adjusting screw 70 against the left end of spring 66, thereby moving plunger 38 toward the right to seat outlet valve 62, cutting off communication between the controlled motor and the reservoir. Since the spring 44 is under compression both piston 34 and plunger 38 will be moved to the right together as a unit. Further movement of plunger 38 unseats inlet valve 28, permitting fluid under pressure from the pressure source to flow toward the controlled motor. Before sufficient force can be exerted to unseat inlet valve element 28, enough force must be stored in actuating spring 66 to overcome the forces biasing the inlet valve element to seated position.

Once the inlet valve element has been unseated, it will not return to its seat until the initial pressure stored in spring 66 has been counteracted by the fluid reaction pressure. (Of course, if the operator continues to increase the force on lever 88, the inlet valve will continue to admit fluid under pressure to the controlled motor until the force exerted by the operator is counteracted.) For a given line pressure acting on the brakes, the total reaction force against spring 66 depends upon the area of the reaction device which is subjected to the pressure prevailing in chamber 22. During the first, or low pressure stage, the reaction pressure is exerted against the combined area of plunger 38 and piston 34, the pressure against the face of piston 34 being transmitted to the plunger by means of spring 44. Because of the relatively large reaction area, a small line pressure will be sufficient to overcome the force stored in spring 66 and close the inlet valve. This means that the line pressure can be closely controlled by the operator during the low pressure stage of operation.

When the line pressure rises to the point at which the force against the face of piston 34 overcomes spring 44, the piston is caused to move rearwardly until its skirt 54 engages flange 56. From then on, the pressure in the controlled motor reacts only against the area of plunger 38. Therefore, in the high pressure stage of operation, the force which the operator must exert on the actuating rod is not unduly large.

Spring 44 should be sufficiently strong to withstand the low line pressures initially developed in chamber 22, and preferably should be installed at a load in excess of the force required to open the inlet valve.

When the operator releases control lever 88, the line pressure, with the assistance of springs 30 and 82, returns the valve elements and reaction device to retracted position, wherein the parts assume the relative locations shown in the figure.

The terms "front," "rear" or any other directional terms are intended to have only a relative connotation to aid in describing the device and are not intended to be interpreted as requiring any particular orientation with respect to any external elements.

Although only one embodiment of the invention has been illustrated and described, various changes in the form and relative arrangement of the parts may be made to suit requirements.

I claim:

1. A fluid pressure control valve comprising a casing having an inlet port, an outlet port, and an exhaust port, said casing including a passage permitting communication between the inlet port and the outlet port, an inlet valve element in said casing controlling said passage, an annular piston reciprocable in the casing between the outlet port and exhaust port, a tubular plunger mounted inside the annular piston and reciprocable therein, said plunger having a passage therethrough providing communication between the outlet and exhaust ports, an outlet valve element in said casing controlling said plunger passage; said outlet and inlet valve elements being so arranged that movement of said outlet valve element will unseat said inlet valve element, said piston including a shoulder thereon, said plunger having a portion cooperating with said shoulder limiting movement of the plunger with respect to said piston, a compressed spring between the piston and plunger urging the piston and plunger apart, said piston, plunger and spring being so arranged that they will move as a unit, a spring having an end engaging the rear of the plunger, an actuating member engaging the other end of the spring to transmit force through the spring to the plunger to actuate said valves, the piston and plunger including portions arranged to be subjected to pressure at the outlet port for transmitting a fluid pressure reaction to said actuating member, said casing including a shoulder arranged to be contacted by said piston to limit movement thereof when the compression force of the compressed spring between the piston and plunger is overcome by outlet fluid pressure acting on the face of the piston, so that at low pressure, reaction force of fluid pressure at the outlet port is transmitted to the actuating member through both the plunger and piston and at high pressure the reaction force of fluid pressure at the outlet port is transmitted to the actuating member through the plunger.

2. A fluid pressure control valve comprising a casing having an inlet port, an outlet port, and an exhaust port, valve means in said casing controlling fluid communication between the outlet port, the inlet and exhaust ports, an annular piston reciprocable in a bore in the casing, a plunger mounted inside the annular piston and capable of reciprocable movement therein, said piston including shoulder means thereon, said plunger having a portion thereon cooperating with said shoulder limiting movement of the plunger with respect to said piston, a spring compressed between said plunger and piston urging them apart so said piston and plunger are movable as a unit in an extended condition, a spring having one end engaging the rear of said plunger, an actuating member engaging the other end of the spring for transmitting force through said spring to said plunger to actuate said valve means, the piston and plunger arranged in said casing subject to pressure at the outlet port and transmitting reaction to said actuating member through said springs, said casing including shoulder means in said bore cooperating with said piston for limiting movement of said piston when the force of the compressed spring between the piston and plunger is overcome by initial fluid pressure at the outlet port acting on the piston, so that increased pressure reaction is thereafter transmitted solely by the plunger to the actuating member.

3. A fluid pressure control valve comprising a casing having an inlet port, an outlet port, and an exhaust port, valve means in said casing controlling fluid communication between the outlet port, the inlet and exhaust ports, and annular piston reciprocable in a bore in the casing, a plunger reciprocably mounted in the annular piston, said piston including shoulder means thereon, said plunger having a portion thereon cooperating with said shoulder limiting movement of the plunger with respect to said piston, a spring urging the plunger away from the piston so the piston and plunger move as a unit in an extended condition, a spring engaging one end of the plunger, and an actuating member engaging the other end of the spring for transmitting force through said spring to the plunger and move said valves; the piston and plunger having portions subjected to fluid pressure at the outlet port operative for transmitting fluid pressure reaction to said actuating member, said casing including shoulder limiting means in said bore, operative to limit movement of said piston when the force of the spring urging the piston and plunger apart is overcome by fluid pressure at the outlet port, so that fluid pressure reaction at the outlet port is transmitted to the actuator by said plunger only, and fluid pressure reacting on said piston is transmitted to said casing providing two-stage transmittal of outlet pressure reaction to said actuating member.

4. A fluid pressure control valve comprising a casing having an inlet port, an outlet port, and an exhaust port, valve means in said casing controlling communication between the outlet port and inlet and exhaust port, an annular piston reciprocable in a bore in the casing, a plunger reciprocably mounted in the center of the annular piston, said piston including shoulder means thereon, said plunger having means thereon cooperating with said shoulder means limiting relative movement of the plunger with respect to the piston, resilient means urging the plunger and piston apart so they will move as a unit in an extended condition, actuating means arranged to exert force on said plunger to move said piston and plunger together in an extended condition, the piston and plunger having portions subjected to fluid pressure at the outlet port operative to transmit fluid pressure reaction to said actuating means, said casing including a shoulder in a said bore operative to be engaged by said piston for limiting movement of said piston when the resilient means is overcome by fluid pressure acting on the portion of said piston subject to fluid pressure, so that the reaction of fluid pressure force at said outlet port is then transmitted solely by said plunger to said actuating means and fluid pressure reaction on said piston is transmitted to said casing.

5. A fluid pressure control valve comprising a casing having an inlet port, an outlet port and an exhaust port, valve means in said casing controlling communication between the outlet port and inlet and exhaust port, a piston reciprocable in a bore in the casing, a plunger reciprocably mounted in the piston, said piston and plunger including cooperating means thereon limiting relative movement of said piston and plunger, means urging the plunger and piston apart so they will move as a unit in an extended condition, actuating means arranged to exert force on said plunger to move said piston and plunger together in an extended condition, the piston and plunger having portions subjected to fluid pressure at the outlet port operative to transmit fluid pressure reaction to said actuating means, said casing including means in said bore operative to engage said piston for limiting movement of said piston when the means urging the piston and plunger apart is overcome by fluid pressure acting on a portion of said piston subject to fluid pressure, so that the reaction of the fluid pressure force of said outlet port is then transmitted solely by said plunger to said actuating means and fluid pressure reaction on said piston is transmitted to said casing.

6. A fluid pressure control valve comprising a casing having an inlet port, an outlet port, and an exhaust, valve means in said casing controlling communication between the outlet port and inlet and exhaust port, a first member reciprocable in a bore in the casing, a second member reciprocably mounted in the first member, said members including stop means thereon limiting relative movement therebetween, means urging the first and second members apart so they will move as a unit, actuating means arranged to exert a force on said second member to move said first and second members together in an extended condition, the first and second members having portions subjected to fluid pressure at the outlet port operative to transmit fluid pressure reaction to said actuating means, said casing including means in said bore operative to engage said first member for limiting movement of said member when the means urging the first and second members apart is overcome by fluid pressure acting on the portion of said first member subject to fluid pressure, so that the reaction of the fluid pressure force at said outlet port is then transmitted solely by said second member to said actuating means and fluid pressure reaction on the first member is transmitted to said casing.

References Cited in the file of this patent

FOREIGN PATENTS

| Number | Country | Date |
|--------|---------|------|
| 515,440 | Great Britain | Dec. 5, 1939 |